United States Patent
Princet

[11] Patent Number: 5,601,379
[45] Date of Patent: Feb. 11, 1997

[54] SUPPORT PLATE STRUCTURE FOR A SCREEN WIPER MECHANISM

[75] Inventor: Joël Princet, Chatellerault, France

[73] Assignee: Valeo Systemes D'Essuyage, La Verriere, France

[21] Appl. No.: 534,738

[22] Filed: Sep. 27, 1995

[30] Foreign Application Priority Data

Sep. 28, 1994 [FR] France .................................. 94 11705

[51] Int. Cl.$^6$ ................................................. B60S 1/34
[52] U.S. Cl. ............................................. 403/269; 403/265
[58] Field of Search ................................... 403/269, 267, 403/265; 29/898.048, 898.049, 898.05

[56] References Cited

U.S. PATENT DOCUMENTS

| | | | |
|---|---|---|---|
| 3,476,496 | 11/1969 | Golden | 403/267 X |
| 5,174,678 | 12/1992 | Gagneux et al. | 403/269 |
| 5,213,008 | 5/1993 | Kanno et al. | 403/267 X |

FOREIGN PATENT DOCUMENTS 2151915  7/1985  United Kingdom .

OTHER PUBLICATIONS

Patent Abstracts of Japan JP63256414; vol. 13, No. 52; published Oct. 1988.

*Primary Examiner*—Anthony Knight
*Attorney, Agent, or Firm*—Morgan & Finnegan, L.L.P.

[57] ABSTRACT

A support plate structure for a screen wiper mechanism comprises a support plate carrying the drive motor, an elongate structural member (10) fixed at one end to the support plate, and a support bearing (14) fixed to the free end portion (12) of the structural member. The bearing carries the drive spindle (16) of the wiper, which is coupled to the motor through a linkage. The bearing (14) comprises a body (18) moulded directly on to the free end portion (12) of the structural member (10).

9 Claims, 2 Drawing Sheets

SUPPORT PLATE STRUCTURE FOR A SCREEN WIPER MECHANISM

FIELD OF THE INVENTION

The present invention relates to a support plate structure for a screen wiper mechanism for carrying and driving a screen wiper such as a motor vehicle windshield wiper, the structure being of the type which includes an elongate structural element carried by a support plate and having a free end portion remote from the latter, and a support bearing fixed to the free end portion.

BACKGROUND OF THE INVENTION

In a support plate structure of the above kind, the support bearing carries, for rotation in it, the drive spindle of the screen wiper mechanism, the drive spindle having a wiper arm secured to it, above the bearing, for the usual back and forth movement in contact with the surface to be wiped. The drive spindle is coupled, through a suitable linkage which imparts the necessary oscillating motion to it, to driving means which are fixed on the support plate of the assembly.

In one known design of such a structure, the elongate structural element is a tubular member, and its free end portion secures the tubular member and the bearing together in such a way as to secure the bearing against any displacement in rotation about the tubular member and against any displacement in the direction of the axis defined by the latter.

In the known design described and shown in German published patent specification No. DE 2 920 899A, the bearing comprises a cylindrical portion in the form of a stump or pedestal, which is received in the open free end portion of the tubular structural element. The bearing has at least one longitudinal opening which is substantially parallel to the axis of this pedestal, and a portion of the wall in facing relationship with the tubular structural element is forced into this opening, by deformation using a seaming punch, in a direction which is substantially parallel to the axis of the tubular element. This technique secures the end portion of the tubular structural element by seaming on to the cylindrical bearing portion that consists of the pedestal, with the latter being inside the free end of the tubular element.

However, it has been found that such an arrangement does not afford a connection that is rigid enough to prevent relative displacement, both in rotation and in straight line motion, between the bearing and the tubular structural element. Thus, in use, an axial clearance is found to occur in the joint.

In addition, such a technique does not readily permit sufficiently accurate axial and angular positioning of the support bearing with respect to the tubular structural element during the seaming operation. Moreover, it calls for the use of a support bearing the body of which is made of metal: as a result, this bearing is very heavy.

DISCUSSION OF THE INVENTION

An object of the present invention is to provide a novel design of a support plate structure for a screen wiper mechanism, which is of the type comprising an elongate structural element having a free end portion which is fixed to a support bearing for a screen wiper drive spindle, and which overcomes the drawbacks discussed above.

According to the invention, a support plate structure of the type just mentioned is characterised in that the body of the bearing is made by moulding, and is moulded over the free end portion of the elongate structural element.

According to a preferred feature of the invention, the bearing body is in one piece, moulded in a plastics material.

According to another preferred feature of the invention, the external profile of the free end portion does not define a surface of revolution about the general axis of the said structural element.

The free end portion of the structural element preferably includes a through hole for the passage through it of the screen wiper drive spindle.

The elongate structural element is preferably a tubular member.

According to a further preferred feature of the invention, the free end portion of this tubular member includes a flattened portion. The longitudinal edges of this flattened end portion of the tubular member are then preferably offset away from the general plane of the flattened portion.

Where the free end portion has a flattened portion as above, its general plane is preferably parallel to the axis of the free end portion as a whole. Preferably this axis lies in the general plane.

The bearing body preferably has a bore in which the screen wiper drive spindle is received directly, for rotational movement therein.

Further features and advantages of the invention will appear more clearly from the following description of a preferred embodiment of the invention, given by way of example only and with reference to the accompanying drawings.

DESCRIPTION OF A PREFERRED EMBODIMENT OF THE INVENTION

Figure 1:
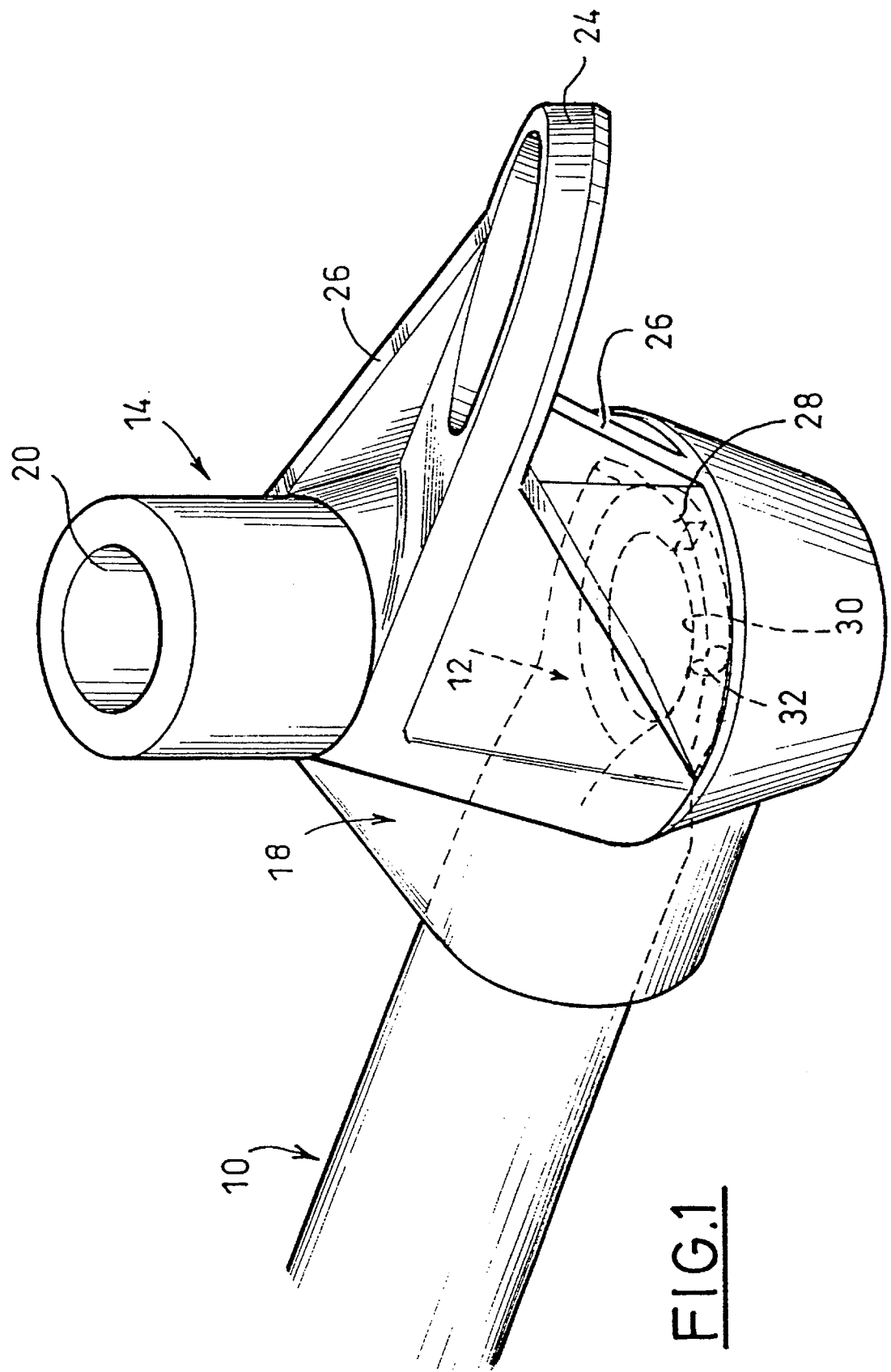
FIG. 1 is a general perspective view showing an end portion of the elongate structural element, with a support bearing moulded on to it, in accordance with the invention.

FIG. 1 shows an end portion of an elongate structural element 10 which is part of a support plate structure (not fully shown in detail in the drawings) for a screen wiper mechanism.

The elongate structural element 10, in the embodiment shown in the drawings, is a hollow cylindrical tubular member having a free end portion 12 which is fixed to a support bearing 14. This bearing 14 serves as a support for a drive spindle 16 (see FIG. 2) which is coupled to a screen wiper arm (not shown) for driving the latter in the usual back and forth motion across a glass surface such as a motor vehicle windshield. The other end of the tubular member 10 is fixed to a support plate (not shown) of the said assembly, which carries a drive motor coupled to the spindle 16 through a conventional linkage. This linkage, and the motor, are not shown.

Figure 2:
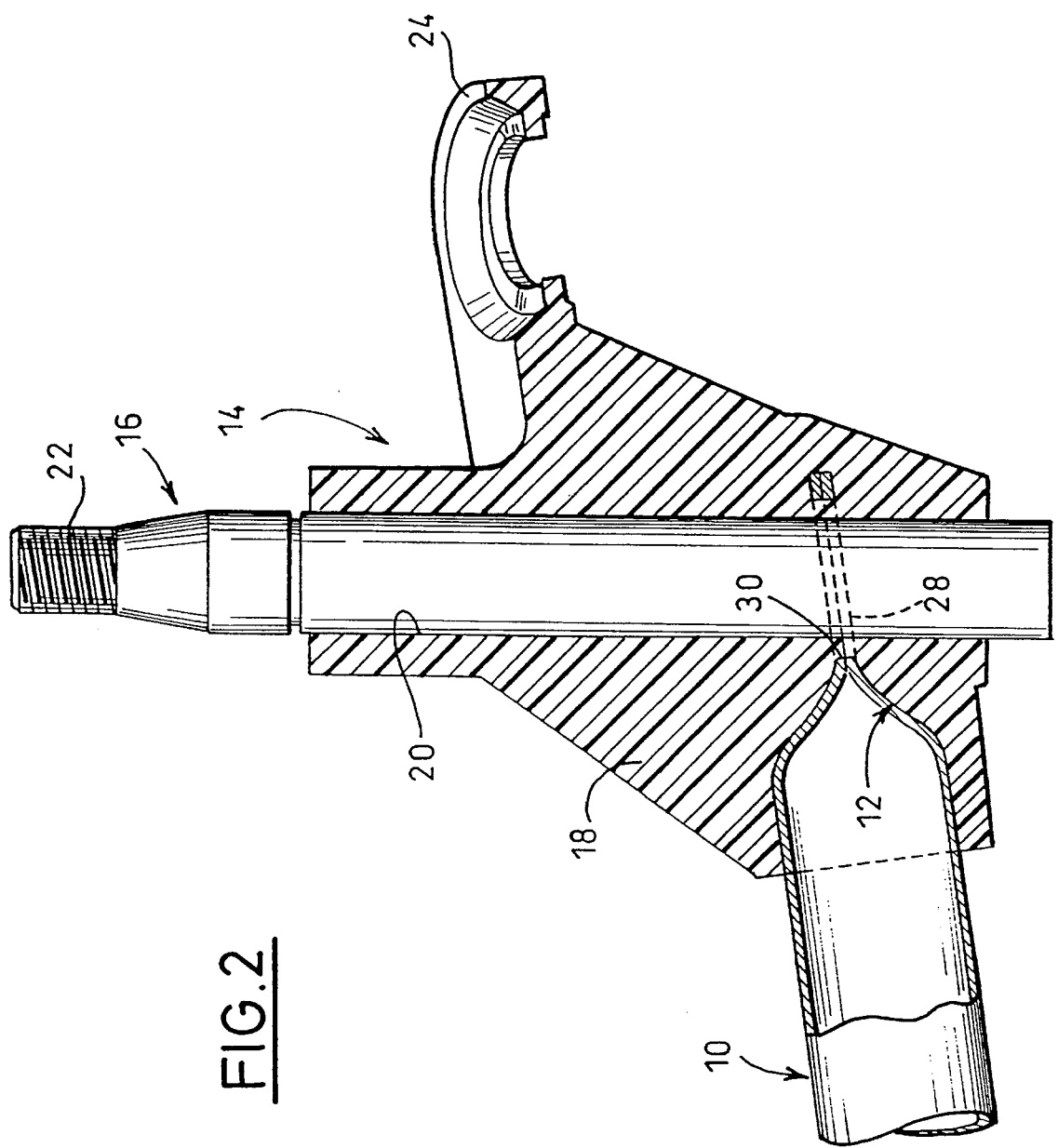
FIG. 2 is an assembled view, mainly in cross section, taken on a plane passing through the axis of the bore for the screen wiper spindle and that of the end portion of the elongate structural element seen in FIG. 1.

As can be seen in FIG. 2, the body 18 of the bearing 14 is a component moulded in a suitable plastics material. The body 18 is formed with a bore 20, in which the body of the screen wiper drive spindle 16 is rotatably fitted. The spindle 16 may be mounted in the bore 20 directly, as shown in FIG. 2, or through interposed bearing sleeves. Its upper end portion 22 is threaded, and is joined to the body of the spindle through a conical portion which, with the threaded end portion 22, projects outside the bore 20. The wiper arm is secured on these portions of the spindle in the usual way.

The bearing body 18 has an integral extension 24, with stiffening ribs 26. The extension 24 has a through hole whereby the structural element is fixed in a suitable location on the bodywork (not shown) of the vehicle.

The bearing body 18 is formed by moulding it on to the end portion 12 of the tubular member 10, so that the end portion 12 is then buried within the body 18. In the embodiment shown in the drawings, this end portion includes a flattened terminal portion 28 lying in a general plane parallel to the longitudinal axis of the tubular member 10. Because of this flattened terminal portion 28, the free end portion 12 within the bearing body 18 has an external profile which is not a surface of revolution, and which therefore prevents any accidental rotation of the bearing 14 with respect to the tubular member 10.

In this example, the free end portion 12 is retained, in the direction of the axis of the tubular member 10, within the bearing body 18 by virtue of a through hole 30 formed in the flattened terminal portion 28. The hole 30 is substantially coaxial with the bore 20 so that the spindle 16 extends freely through the hole 30.

In addition, in order to improve still further the resistance of the tubular member 10 against rotation with respect to the body 18 of the bearing 14, and to increase the rigidity of the flattened terminal portion 28, the longitudinal edges 32 of the latter are offset away from the general plane of the flattened terminal portion 28 (and therefore of the end portion 12), as is shown in FIG. 1.

It will readily be seen that the design described above is particularly simple to make, and that it also affords reliable fastening of the bearing 14 on the free end portion of the elongate structural element 10.

Making the bearing 14 by moulding it on to the tubular member 10 has the particular advantage that it ensures, without any need to modify either the shape of the bearing 14 or that of the free end portion of the tubular member 10, that the bearing 14 will be fixed in the desired angular orientation with respect to the general axial direction of the tubular member 10, and therefore with respect also to the support plate to which the latter is fixed. Accordingly, the arrangement enables a range of support plate structures to be made using a minimum number of different components, and with significantly reduced mould tooling.

The invention is not limited to the case where the bearing body 18 is moulded in a plastics material: the choice of synthetic materials for this purpose allows the weight of the bearing 14 to be considerably reduced.

I claim:

1. A screen wiper mechanism including a rotatable screen wiper drive spindle, the mechanism comprising an elongate tubular structural element having a free end portion, the free end portion being flattened to define an outer periphery and a general plane of the free end portion, the free end portion having edges formed on the outer periphery thereof that are raised away from the general plane defined by the free end portion, and a support bearing fixed to the free end portion for supporting the drive spindle, the bearing having a bearing body molded onto the free end portion.

2. A screen wiper mechanism according to claim 1, wherein the bearing body is formed in one piece from plastics material.

3. A screen wiper mechanism according to claim 1, wherein the elongate structural element defines a general axis thereof, the free end portion of the elongate structural element having a profile other than that of a surface of revolution about the general axis.

4. A screen wiper mechanism according to claim 1, wherein the free end portion has a through hole for receiving a drive spindle therein.

5. A screen wiper mechanism according to claim 1, wherein the elongate structural element defines a general axis thereof, the general plane defined by the flattened free end portion being parallel to the general axis.

6. A screen wiper mechanism according to claim 5, wherein the general axis lies in the general plane.

7. A screen wiper mechanism according to claim 1, wherein the bearing body has a bore formed therein for directly receiving the screen wiper drive spindle for rotation in the bearing body bore.

8. A screen wiper mechanism according to claim 1, wherein the bearing body further comprises an extension protruding therefrom, the extension having a hole formed therein for stabilizing the drive spindle.

9. A screen wiper mechanism according to claim 8, wherein the extension comprises at least one stiffening rib to further stabilize the drive spindle.

* * * * *